252. COMPOSITIONS,
148

Patented July 11, 1939

2,165,852

UNITED STATES PATENT OFFICE 2,165,852

PROCESS AND BATH FOR CLEANING METALS

Jesse Harmon and David M. McQueen, Wilmington, Del., assignors to E. I. du Pont de Nemours & Company, Wilmington, Del., a corporation of Delaware No Drawing. Application April 27, 1938, Serial No. 204,625

4 Claims. (Cl. 148—8)

This invention relates to the cleaning and pickling of metals with acids and is particularly directed to processes and acid baths wherein condensation products of a phenol, formaldehyde, and ammonia, or of the same with amines, are used as inhibitors.

The dilute non-oxidizing acids which are commonly used for pickling metals attack not only the scale and incrustations which it is desired to remove, but also attack and cause pitting of the clean base metal. It is customary in the art to arrest such attack of the base metal by adding to the acid small amounts of inhibitors.

Of the inhibitors heretofore available, unfortunately many of the most effective have been likewise the most expensive. For instance, certain effective inhibitors are organic compounds of very complex structure which are prepared by involved and multi-step operations from crude materials which are in themselves relatively expensive. The high cost of such inhibitors has prevented their use in many instances even though their effectiveness was unquestioned.

Now we have found that certain inexpensive condensation products of a phenol, formaldehyde, and ammonia, and of the same with amines, are highly effective inhibitors for acid metal pickling baths and processes. The presence of a small amount of one of these resins in a pickling bath does not restrain the attack and removal of undesirable oxide and scale by the acid, but does effectively inhibit the action of the acid on the clean base metal once the oxide and scale have been removed.

The resins which we have found effective as inhibitors are reaction products of formaldehyde, ammonia, and a phenol, and are produced by condensing formaldehyde and a suitable phenol in the presence of a substantial amount of ammonia and with or without an amine also present.

Metal cleaning and pickling baths employing these phenol-formaldehyde-ammonia or phenol-formaldehyde-ammonia-amine resins as inhibitors in accordance with our invention may be used for the treatment of metals in the customary manner. The resins are stable in the acid baths even at elevated temperatures and effectively control the action of acids on metals over long periods of use.

The nature of the substances which we have found to be effective inhibitors and their manner of preparation and use will be better understood by reference to the following illustrative examples.

Example 1

A phenol-formaldehyde-ammonia resin was prepared in the following manner for use as an inhibitor according to our invention.

To a mixture of ninety-four parts of phenol, one hundred thirty-nine parts of water, and sixty-one parts of aqueous twenty-eight per cent ammonia water there was added with mechanical stirring one hundred twenty-two parts of aqueous thirty-seven per cent formaldehyde solution and the temperature was kept below about 25° C. The reaction mixture was then heated at 90 to 95° C. for about an hour during which time an oil was formed. The reaction mixture was then cooled to 40° C. and forty and five-tenths parts more of aqueous thirty-seven per cent formaldehyde solution were added and the mixture was again heated at 95° C. with mechanical stirring for an hour. At the end of this time a heavy plastic mass had formed. The resinous mass was cooled whereupon it became quite brittle. It was then ground in the presence of some water to a smooth paste, filtered, washed well with water, air dried for a day and then vacuum dried at room temperature until it came to constant weight. One hundred three parts by weight of product was obtained in the form of a yellow powder.

A pickling bath of our invention was made by dissolving five parts by weight of this phenol-formaldehyde-ammonia condensation product in one hundred thousand parts of five per cent sulfuric acid solution. The effectiveness of this bath for cleaning and pickling metals was demonstrated by the following test.

Two three inch by four inch pieces of S. A. E. 1020 hot rolled scaled steel were cleaned, weighed together, and immersed in a portion of the above-described inhibited pickling solution at 180° F. The pickling solution was allowed to act on the scaled steel for one-half hour, at the end of which period the scale had been completely removed. The pieces were withdrawn from the solution, rinsed, dried and weighed again. The pieces were then returned to the pickling solution for one hour, after which they were again rinsed, dried and weighed. The pieces were then returned to the solution for an additional hour and a final weighing taken. For comparison, weighed pieces of similar size and of the same type of steel were descaled and pickled in an uninhibited five per cent sulfuric acid solution under exactly similar conditions for similar periods, weighing being taken after each period. The "efficiency" of the inhibitor was calculated by dividing the loss in weight of the pieces in the inhibited solution by the loss in weight of the pieces in the uninhibited solution and subtracting this quotient from one hundred.

By the above-described "inhibitor efficiency test" the inhibited bath of this example had an efficiency of ninety-two and seven-tenths per cent for both the first and second hour periods.

In Example 1 a phenol-formaldehyde-ammonia resin is described, and its use as an inhibitor in accordance with our invention is shown. Such resins may be modified by the presence of an amine. The preparation and use of such a product is shown in Example 2.

*Example 2*

A phenol-formaldehyde-ammonia-amine resin was prepared by condensing phenol, formaldehyde, ammonia, and diethanolamine in the following manner.

A mixture of ninety-four parts of phenol, twenty-six and three-tenths parts of diethanolamine, sixty-one parts of aqueous twenty-eight per cent ammonia, and forty parts of water was cooled to 10° C. and one hundred fifty parts of aqueous thirty-seven per cent formaldehyde solution were added with mechanical stirring. The reaction mixture warmed spontaneously to about 55° C. After the spontaneous reaction had subsided the mixture was heated in a water bath with mechanical stirring at 85 to 92° C. for about 1.25 hours. At the end of this time a dough-like yellow resinous mass had formed. The resin was allowed to cool and worked up by the method outlined in Example 1. One hundred thirteen parts of a light yellow amorphous powder was obtained as the product.

A pickling bath for metals was made in accordance with our invention by dissolving five parts of the above-described product in one hundred thousand parts of five per cent sulfuric acid. An efficiency test on this bath was made by the method described in Example 1, and the efficiency of the bath was found to be ninety-two and three-tenths per cent.

Another phenol-formaldehyde-ammonia-amine resin representative of the inhibitors of our invention was prepared by condensing phenol, formaldehyde, ammonia, and aniline as shown in Example 3.

*Example 3*

A phenol-aldehyde-ammonia-amine condensation product was made in the following manner.

A mixture of ninety-four parts of phenol, eighteen and six-tenths parts of aniline, sixty-one parts of aqueous twenty-eight per cent ammonia and forty parts of water was cooled to 10° and one hundred fifty parts of aqueous thirty-seven per cent formaldehyde solution was added with mechanical stirring. The reaction mixture warmed spontaneously to about 55° C. After the spontaneous reaction had subsided the mixture was heated in a water bath with mechanical stirring at 85 to 92° C. for about one and one-quarter hours. At the end of this time a dough-like yellow resinous mass had formed. The resin was allowed to cool and worked up by the method outlined in Example 1. One hundred thirty-five parts by weight of a light yellow amorphous powder was obtained as the product.

A bath for cleaning and pickling metals in accordance with our invention was made by dissolving five parts by weight of the above-described product in one hundred thousand parts of five per cent sulfuric acid solution. The efficiency of this pickling bath was tested by the method described in Example 1 and was found to be eighty-one and three-tenths per cent.

Certain particular phenol-formaldehyde-ammonia and phenol-formaldehyde-ammonia-amine resins representative of the inhibitors which may be used in our novel metal pickling baths and processes have been shown in the above examples. It will be understood that numerous other suitable resins prepared by condensing formaldehyde and ammonia with other phenolic compounds in the presence or absence of an amine may be used without departing from the scope of our invention.

Phenolic compounds reactive with formaldehyde, such as cresols, xylenols, naphthols, hydroxy diphenyl, and substituted phenols can be used instead of the phenol of the above examples to make inhibitors for metal pickling baths according to our invention.

In place of the formaldehyde of the above examples, substances which yield formaldehyde such as hexamethylene tetramine, methylene chloride, or paraformaldehyde may be used to produce resins which are effective inhibitors.

As the amine constituent used in making a phenol-formaldehyde-ammonia-amine resin, any amine having at least one amino hydrogen atom may be employed. The amine may have one or several amino groups, may be aliphatic (including alicyclic) aromatic or heterocyclic, may be saturated or unsaturated, and may have other substituent groups. Specific suitable amines in addition to those of the examples are, for instance, methylamine, diethylamine, hexylamine, dodecylamine, piperidine, benzylamine, naphthylamines, and cyclohexylamine.

The metal cleaning and pickling baths of our invention may be widely varied in such particulars as choice of acid concentration, inhibitor concentration and temperature in accordance with considerations known to the art. Any suitable acid may be used provided it does not have so great an oxidizing power as to destroy the inhibitor.

By employing these and similar variations, those skilled in the art may devise numerous acid baths containing various phenol-formaldehyde-ammonia or phenol-formaldehyde-ammonia-amine resins as inhibitors for cleaning and pickling metals without departing from the scope of our invention.

We claim:

1. A bath for cleaning and pickling metals comprising a non-oxidizing acid and a condensation product of formaldehyde, ammonia, and a phenol.

2. A bath for cleaning and pickling metals comprising a non-oxidizing acid and a condensation product of formaldehyde, ammonia, a phenol, and an amine.

3. In a process for cleaning and pickling metals, the step comprising contacting the metal with a bath comprising a non-oxidizing acid and a condensation product of formaldehyde, ammonia and a phenol.

4. In a process for cleaning and pickling metals, the step comprising contacting the metal with a bath comprising a non-oxidizing acid and a condensation product of formaldehyde, ammonia, a phenol, and an amine.

JESSE HARMON.
DAVID M. McQUEEN.